April 24, 1928.

C. M. ALEXANDER 1,667,136

GAS AND LIQUID CONTACT APPARATUS

Filed Nov. 27, 1926    2 Sheets-Sheet 1

INVENTOR
Clive M. Alexander
BY
Pennie, Davis, Marvin & Edmonds
ATTORNEYS

April 24, 1928.                                              1,667,136
C. M. ALEXANDER
GAS AND LIQUID CONTACT APPARATUS
Filed Nov. 27, 1926          2 Sheets-Sheet 2
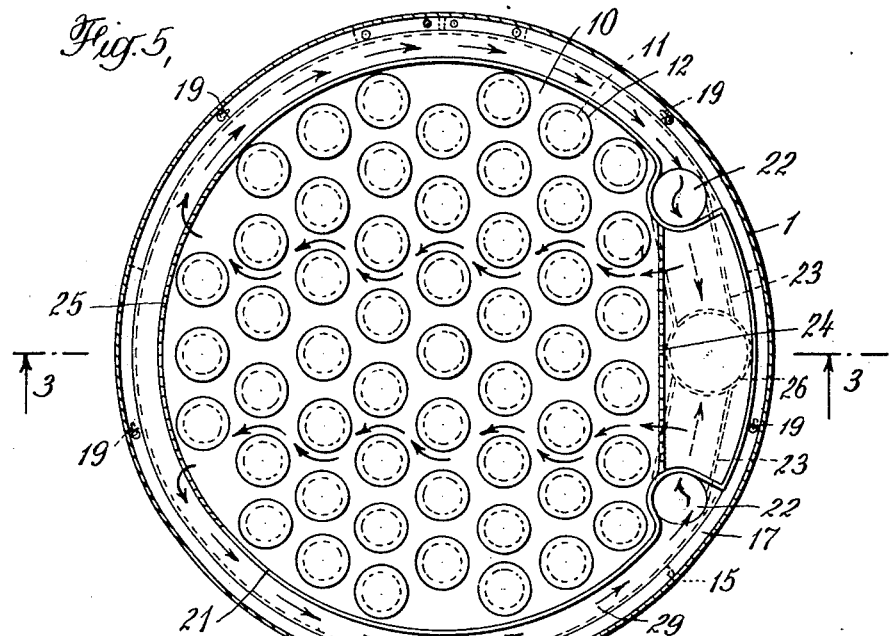
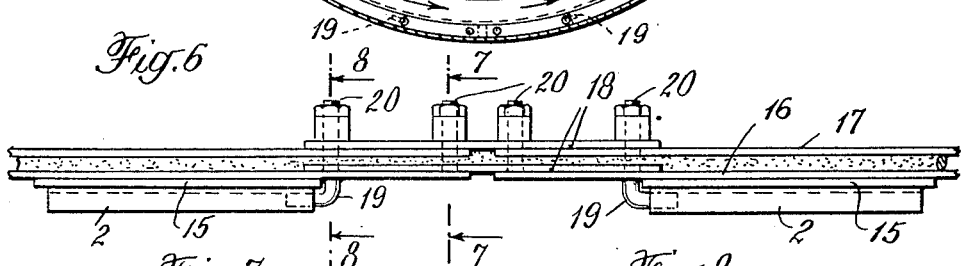
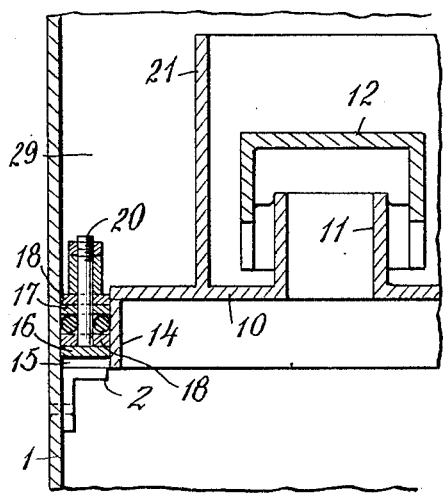
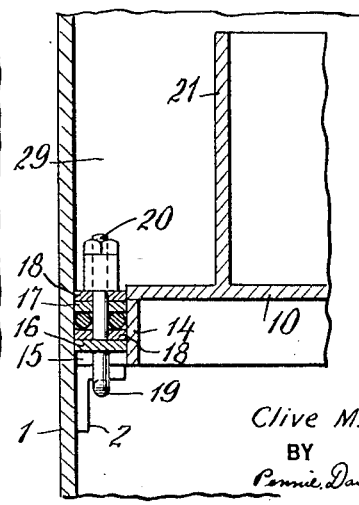
INVENTOR
Clive M. Alexander
BY
ATTORNEYS Patented Apr. 24, 1928.

1,667,136

UNITED STATES PATENT OFFICE.

CLIVE M. ALEXANDER, OF TULSA, OKLAHOMA.

GAS AND LIQUID CONTACT APPARATUS.

Application filed November 27, 1926. Serial No. 151,067.

This invention relates to improvements in gas and liquid or vapor and liquid contact apparatus. More particularly the present invention relates to improved bubble towers such as are used for fractionating towers, absorbing towers, scrubbing towers and the like where it is desired to intimately contact a vapor or gas with a liquid. The invention also includes an improved tray which may be advantageously employed in the improved bubble tower of the invention, but which may also be advantageously adapted to other types of gas and liquid or vapor and liquid contact apparatus.

Towers for these several purposes are commonly made up of a series of pans or trays in each of which a number of upwardly directed nipples are arranged, caps being arranged over the nipples to compel gases and vapors rising through the nipple to bubble under the rim or through openings in the side walls of the cap through a pool of liquid maintained on the pan or tray. Overflow connections are also provided to maintain a liquid level at or above the upper edge of the openings in the bubble caps through which the gases or vapors are discharged and to permit excess liquid to pass to the next lower pan or tray in the series, but to form a seal preventing the gases or vapors from passing upwardly therethrough to the next higher pan or tray in the series.

Various arrangements of trays and overflow connections have been employed, in some of which the overflow connections for adjacent trays were arranged on opposite sides of the tower so that the liquid entering from the next higher tray is required to flow across the full width of the pan or tray before being permitted to pass to the next lower pan of the series. Another arrangement frequently employed is to arrange the overflow connections between all of the pans or trays on the same side of the bubble tower.

The former arrangement has the advantage of preventing the formation of dead spots, a condition common in towers with the second named arrangement, in which parts of the liquid body more remote from the overflow connections are permitted to remain for a considerable period, becoming increasingly saturated with absorbable or condensable constituents while parts of the body of liquid nearest the overflow connections are continually replenished with fresh liquid from a higher tray, the excess liquid passing to the next lower tray being less saturated with the absorbable or condensable constituents from the gas or vapor than that lying stagnant in the socalled dead spots, and insures a substantially uniform amount of contact between the gas or vapor and all parts of the liquid stream whereby the liquid in passing across the tray becomes progressively saturated.

The first named arrangement, however, has the disadvantage that while the liquid passing downwardly through the tower contains a progressively increasing amount of absorbable constituents, or, as in the case of a fractionating tower, a progressively increasing amount of higher boiling and decreasing amount of lower boiling constituents so that the composition of the liquid entering consecutive trays differs by approximately equal increments, the composition of the liquid on two adjacent trays on the side of the overflow connection between them is approximately the same while that on the opposite side differs by a much greater increment than that of the liquid entering the two adjacent trays. With this condition existing the gas or vapor passing upwardly on either side of the tower is contacted in alternate trays with a liquid of substantially the same composition, temperature or degree of saturation as it encountered in the previous tray so that only a slight additional amount of absorption or condensation may be expected as a result of the second contacting. The efficiency of the tower as an absorber or condenser is therefore greatly reduced as a considerable portion of each tray is of little or no utility. The accuracy of fractionation which may be secured is also greatly impaired due to the irregular gradient of the composition of the liquid with which the gases or vapors are contacted and the consequent irregular gradient in the partial pressure of any one constituent of the vapors in passing through the tower.

This invention provides an improved bubble tower of special value in operations of the type above described. With the improved bubble tower of the invention it is possible to conduct fractionation or absorbing operations so that a uniform gradient of composition of liquid is maintained between corresponding parts of the liquid body on each of the consecutive trays of the series and at the same time prevent the formation of dead spots in the liquid body on any one tray by promoting the distribution and circulation of the liquid over all parts of the trays or pans so that all sections become substantially equal in their effectiveness in removing the absorbable and condensable constituents from the gas or vapor subjected to the absorbing and condensing operation, whereby the capacity of the tower is materially increased and accurate fractionation made possible.

In the improved bubble tower of the invention the liquid enters the compartment formed by any two adjacent pans or trays at one side and is required to pass across the surface of the lower of the two trays in a uniformly distributed stream, in contact with gases or vapors passing upwardly therethrough, to the opposite side where it is withdrawn and returned to the side of the compartment to which it was originally introduced, through one or more troughs before being permitted to pass to the next lower pan or tray of the series.

The troughs through which the liquid is returned after passing across the active portion of the tray are preferably arranged around the outer edge of the tray and in free communication with the vapor space of the compartment.

The trays may be advantageously constructed so that the wall of the tower itself forms the outer wall of the troughs so that the liquid passing through the trough is subjected to indirect contact heat exchange relations with the atmosphere through the outer wall of the tower.

This arrangement is particularly advantageous in an absorption tower in which a rich gas is to be contacted with a liquid absorbing medium. In such an operation, in the ordinary type of bubble tower, the heat of absorption may increase the temperature of the absorbent medium to such an extent as to materially decrease its absorptive capacity and frequently causes the liquid on one or more of the trays to foam, thereby destroying the liquid seal surrounding the bubble caps on that tray and thereby still further reducing the capacity of the tower.

The improved bubble tower of the invention by subjecting the absorbing medium to the cooling effect of heat transfer through the tower walls intermediate successive passages across the active portion of each tray, while flowing in a relatively compact stream in free communication with the vapor space of the compartment, reduces the temperature of the liquid absorbing medium, tends to prevent the formation of foam and to promote the breaking up of any foam formed during previous contacting with the gases or vapors.

In extreme cases it may be advantageous to provide additional cooling means, such as cooling coils through which an external cooling medium may be circulated, to assist in further reducing the temperature of the liquid absorbent intermediate its contact with the gases or vapors in the successive trays.

Where a bubble tower equipped with other types of trays is already installed one or more of these trays in intermediate positions may advantageously be replaced by the improved tray of the invention. Such an arrangement assists in cooling the absorbing medium at intervals during its passage through the tower and in preventing the formation of foam thereby increasing the capacity of the bubble tower.

A bubble tower embodying the invention is diagrammatically illustrated in the accompanying drawings and the invention will be further described in connection therewith, but it will be understood that while the invention is exemplified by the further description and illustration it is not limited thereto.

In the drawings,

Fig. 5 is a plan view partly in section of a bubble tower embodying the invention.

Fig. 6 is an elevation to an enlarged scale of the packing rings by means of which the trays may be sealed with the walls of the container.

Figs. 7 and 8 are fragmentary views in section taken along the lines 7—7 and 8—8 of Fig. 6, respectively, showing in detail one method by which the trays may be supported and fastened within the container and the rims of the trays sealed with the wall of the container.

Figure 1:
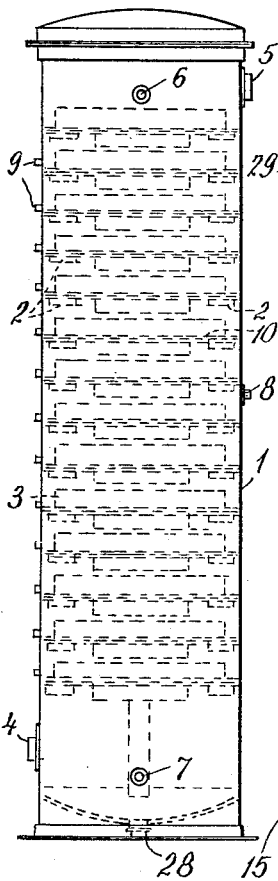
Fig. 1 is a diagrammatic representation in elevation of a bubble tower embodying the invention.

Referring to Fig. 1, the tower shown consists of a vertical container or shell 1 having a removable top through which the trays may be inserted or removed for inspection or cleaning. Angle irons 2 may be fastened to the interior wall of the shell in spaced relation to support the trays 3. Gas or vapor to be supplied to the tower for treatment may be introduced through connection 4 and any gas or vapor remaining unabsorbed or uncondensed, withdrawn from the tower through connection 5. Liquid may be supplied to the tower through connection 6 and drawn off, together with any constituents absorbed or condensed from the gas or vapors through connections 7. A peep-hole 8 may be provided at an intermediate point in the shell for inspection of the interior. A series of test connections 9 are arranged to permit withdrawal of test samples from each of the trays in the series.

The tray may advantageously be constructed of the plate 10 having a plurality of nipples, extending upwardly therefrom with bubble caps 12 arranged over the nipples so that gas or vapor arising through the nipples is compelled to bubble through liquid maintained at a level above the discharge openings of the bubble caps. The bubble caps may advantageously be of the type described in my copending application Serial No. 124,340 filed July 23, 1926. The plates may be made rigid by providing the I beam stiffeners 13. An angle ring 14 is arranged to extend entirely around the rim of the plate and is securely fastened thereto, for example, by welding. The outwardly directed leg of the angle ring is cut away in places leaving the extensions 15 spaced to register with the supporting angles 2 on the inner wall of the vertical container.

The rim of the trays may be sealed with the wall of the container by the use of a suitable sealing ring, for example, the sealing ring shown in detail in Fig. 6. The construction of the ring here shown consists of a pair of flat bars 16 arranged in the form of a semi-circle with upwardly extending stud bolts 20, provided with suitable nuts and spacers, fastened to their upper surface and lugs 19 having their lower portion bent parallel to the ring secured to their lower surface. The latter are spaced to register with the end of the extensions 15 of the angle ring and the angles 2 in the shell of the container. Rings 17 are similar to the bars 16, but are drilled to match the upwardly directed stud bolts in the latter. Splice bars 18 are provided to complete the ring. A suitable packing material is inserted between the rings 16 and 17 so that on tightening the nuts on the stud bolts 20 the packing material is expanded laterally to form a seal between the back of the angle ring and the wall of the container.

A ring 21, is arranged on the upper surface of the plate at a spaced distance from its edge and entirely surrounding the bubble caps or other gas and liquid contacting means. The height of this ring is such that it does not extend to the next higher tray in the series so that the annular passage 29 between the ring and the wall of the container is in free communication with the vapor space of the compartment. On one side of the tray this ring is extended substantially to the edge of the plate and is indented on either side of this extended portion so that the holes 22 communicating with the troughs 23 on the lower side of the plate are separated from the active gas and liquid contacting portion of the tray.

A partition 24 slightly lower than the ring 21, having its upper edge serrated, connects the indented portions of the ring and together with the extended portion forms a cup adapted to receive and maintain a pool of liquid into which the discharge pipe 26 from the next higher tray of the series depends. At the opposite side of the tray part of the ring 21 is cut away. The upper edge of this cut away portion 25 is also serrated and arranged at a slightly lower level than the top of the partition 24, but sufficiently high to maintain the desired depth of liquid on that portion of the tray within the ring. A small hole 27 is provided at the bottom of the ring so that the trays will drain when the tower is not in operation.

The pipe 26 depending from the lowest tray of the series extends below the level of the connections 7 from which the charged liquid is withdrawn so that gases or vapors cannot pass upwardly therethrough. A connection 28 is provided at the bottom of the container so that the tower may be drained when desired.

In the operation of the improved tower of the invention gases or vapors are supplied at the bottom of the tower through connection 4 and pass upwardly through the tower contacting with the liquid streams flowing in the same direction across each of the trays in the series successively. Any unabsorbed or uncondensed gases or vapors remaining may be withdrawn through connection 5 and subjected to further treatment or conducted directly to suitable condensing and storage means.

Where a liquid is supplied from an external source to serve as an absorbing medium or assist the condensing operation it may be introduced to the top of the tower as desired through section 6.

Where the tower is operated as a simple reflux tower it is not necessary to supply additional liquid as reflux condensate and the cooling effect of heat transfer therefrom through the walls of the container may be relied upon entirely to produce an effective refluxing action.

Figure 2:
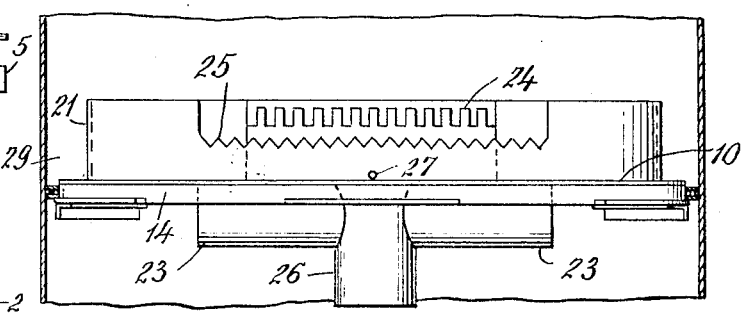
Fig. 2 is a fragmentary view in elevation and partly in section of a tower showing an improved tray embodying the invention supported in a vertically arranged container.
Figure 3:
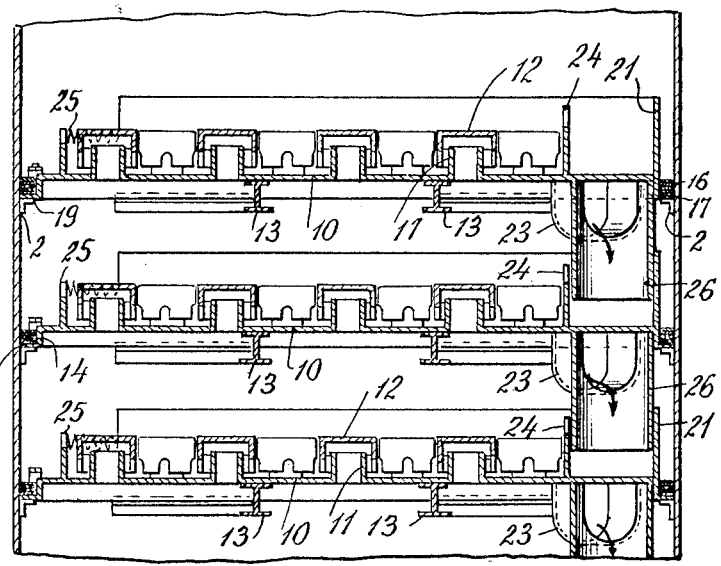
Fig. 3 is a section along the line 3—3 of Fig. 5.
Figure 4:
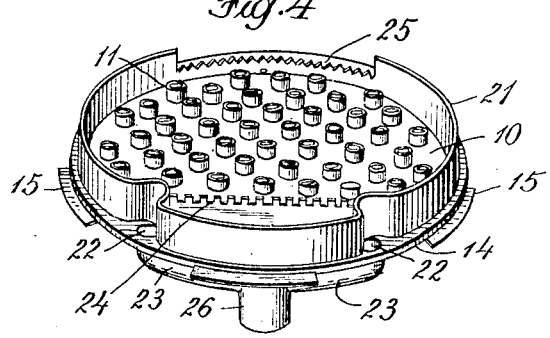
Fig. 4 is a perspective view of a tray shown in Fig. 2.

In passing downwardly through the reflux tower the liquid which accumulates in the receiving means on each of the successive trays overflows the partition 24 and is uniformly distributed by the serrated upper edge of the partition. The liquid entering the center portion of the tray from the receiving means flows across the tray to the opposite side from which it is discharged into the annular trough formed by the ring 21 and the walls of the container as indicated by the arrows in Fig. 2 of the drawings. The serrated edge of the cut away portion of the ring 21 accurately maintains a constant liquid level within the ring and by promoting uniform withdrawal assists in maintaining a substantially constant composition of all parts of the liquid stream with which the gases or vapors are contacted. The liquid is then conducted in compact streams in free communication with the vapor space of that compartment and in direct contact heat exchanging relation with the walls of the container by the annular passages 29 to the holes 22 immediately adjacent the receiving means where it is discharged through the plate to the troughs 23. The liquid is thence conducted by the troughs 23 to the central discharge pipe 26 through which it passes to the receiving means in the next lower tray of the series at a point directly below that at which it was received in the preceding tray.

I claim:

1. An improved bubble tower comprising a vertically arranged container having a series of plates supported therein in spaced relation, said plates being sealed with the walls of the container so as to form a series of compartments intermediate successive plates of the series, means for receiving a liquid at corresponding points in a vertical line on the upper surface of each of said plates and for flowing a stream of the liquid therefrom across each of the plates in the series in the same direction, means for contacting liquid on the surface of said plates with a gas or vapor rising upwardly therethrough, means for returning the liquid in compact streams in free communication with the vapor space of the compartment immediately above each of said plates to a point on said plates near said receiving means and for discharging the liquid therefrom through each of said plates to the receiving means for the next lower plate of the series.

2. An improved bubble tower comprising a vertically arranged container having a series of plates supported therein in spaced relation, said plates being sealed with the walls of the container so as to form a series of compartments intermediate successive plates of the series, means for receiving a liquid at corresponding points in a vertical line on the upper surface of each of said plates and for flowing a stream of the liquid therefrom across each of the plates in the series in the same direction, means for contacting liquid on the surface of said plates with a gas or vapor rising upwardly therethrough, means for returning the liquid in annular paths at the outer edge of said plates and in heat exchanging relation with the wall of the container to a point on the plates near that at which said liquid was received, and means for discharging the liquid therefrom through each of said plates to the receiving means for the next lower plate of the series.

3. An improved bubble tower comprising a vertically arranged container having a series of plates supported therein in spaced relation, said plates being sealed with the walls of the container so as to form a series of compartments intermediate successive plates of the series, means for receiving a liquid at corresponding points in a vertical line on the upper surface of each of said plates and for flowing a stream of the liquid therefrom across each of the plates in the series in the same direction, means for contacting liquid on the surface of said plates with a gas or vapor rising upwardly therethrough, means for returning the liquid in annular paths at the outer edge of said plates to a point near said receiving means said annular paths being in free communication with the vapor space of the compartment immediately above said plates, and means for discharging the liquid therefrom through each of said plates to the receiving means for the next lower plate of the series.

4. An improved bubble tower comprising a vertically arranged container having a series of plates supported therein in spaced relation, said plates being sealed with the walls of the container so as to form a series of compartments intermediate successive plates of the series, means for receiving a liquid at corresponding points in a vertical line on the upper surface of each of said plates and for flowing a stream of the liquid therefrom across each of the plates in the series in the same direction, means for contacting liquid on the surface of said plates with a gas or vapor rising upwardly therethrough, means for returning the liquid in annular paths at the outer edge of said plates in heat exchanging relation with the walls of the container to a point near said receiving means, said annular paths being in free communication with the vapor space of the compartments immediately above said plates and means for discharging the liquid through each of said plates to the receiving means for the next lower plate of the series.

5. An improved bubble tower comprising a vertically arranged container having a series of plates supported therein in spaced relation, said plates being sealed with the walls of the container so as to form a series of compartments intermediate successive plates of the series, means for receiving a liquid at corresponding points in a vertical line on the upper surface of each of said plates and for flowing a stream of the liquid therefrom across each of the plates in the series in the same direction, means for contacting liquid on the surface of said plates with a gas or vapor rising upwardly therethrough, and means for cooling and returning the liquid in compact streams to the receiving means on the next lower plate of the series.

6. An improved bubble tower comprising a vertically arranged container having a series of plates supported therein in spaced relation, said plates being sealed with the walls of the container so as to form a series of compartments intermediate successive plates of the series, means for receiving a liquid at corresponding points in a vertical line on the upper surface of each of said plates and for flowing a stream of the liquid therefrom across each of the plates in the series in the same direction, means for contacting liquid on the surface of said plates with a gas or vapor rising upwardly therethrough, means for cooling and returning the liquid in compact streams and in free communication with the vapor space of the compartment immediately above said plates to a point near said receiving means, and means for discharging the liquid downwardly therefrom through each of said plates to the receiving means for the next lower plate of the series.

7. An improved bubble tower comprising a vertically arranged container having a series of plates supported therein in spaced relation, said plates being sealed with the walls of the container so as to form a series of compartments intermediate successive plates of the series, means for receiving a liquid at corresponding points in a vertical line on the upper surface of each of said plates and for flowing a stream of the liquid therefrom across each of the plates in the series in the same direction, means for contacting liquid on the surface of said plates with a gas or vapor rising upwardly therethrough, and means for returning the liquid in compact streams to the receiving means on the next lower plate of the series.

8. An improved tray for gas and liquid contact apparatus comprising a horizontally arranged plate adapted to be supported in a vertically arranged container, means for receiving a liquid from a point above said plate and for flowing a stream of the liquid therefrom across the upper surface of said plate to the opposite side thereof, means for contacting said liquid stream with a gas rising upwardly through said plate, and means adapted to cooperate with the wall of the container for returning the liquid in a compact stream from the opposite side of the plate to a point near said receiving means and for discharging the liquid therefrom to the lower side of the plate.

9. An improved tray for gas and liquid contact apparatus comprising a horizontally arranged plate adapted to be supported in a vertically arranged container, means for receiving a liquid from a point above said plate, means adapted to cooperate with the wall of the container to form an annular passage at the outer edge of said plate, means for flowing a stream of liquid from said receiving means across the upper surface of the plate to the opposite side thereof and for contacting said liquid stream with a gas rising upwardly through the plate, means for discharging said liquid into the annular passage at a point substantially opposite said receiving means, and means for discharging the liquid from the annular passage at a point near said receiving means to the lower side of the plate.

10. An improved tray for gas and liquid contact apparatus comprising a horizontally arranged plate adapted to be supported in a vertically arranged container, means for receiving a liquid from a point above said plate and for flowing a stream of liquid therefrom across the upper surface of said plate to the opposite side thereof, means for contacting said liquid stream with a gas rising upwardly through the plate and means adapted to cooperate with the wall of the container to form an open trough for returning the liquid in a compact stream from the opposite side thereof to a point near said receiving means while in free communication above one wall of said trough with said contacting means and for discharging the liquid therefrom to the lower side of the plate.

11. An improved tray for gas and liquid contact apparatus comprising a horizontally arranged plate adapted to be supported in a vertically arranged container, means for receiving a liquid from a point above said plate and for flowing a stream of the liquid therefrom across the upper surface of the plate to the opposite side thereof, means for contacting the said liquid stream with a gas rising upwardly through the plate, means adapted to cooperate with the wall of the container to return the liquid in a compact stream in heat exchanging relation with said container wall from the opposite side of the plate to a point near said receiving means, and means for passing the liquid downwardly therefrom through said plate and discharging it from the lower side thereof.

In testimony whereof I affix my signature.

CLIVE M. ALEXANDER.